(No Model.)

C. F. SANDERS.
HAME TUG COUPLING.

No. 582,488. Patented May 11, 1897.

Witnesses:
L. C. Hills.
B. C. Frazee.

Inventor:
C. F. Sanders
By Bell & Glaser
Attys.

UNITED STATES PATENT OFFICE.

CHRISTIAN F. SANDERS, OF HEDRICK, IOWA.

HAME-TUG COUPLING.

SPECIFICATION forming part of Letters Patent No. 582,488, dated May 11, 1897.

Application filed January 30, 1897. Serial No. 621,343. (No model.)

*To all whom it may concern:*

Be it known that I, CHRISTIAN F. SANDERS, a citizen of the United States, residing at Hedrick, in the county of Keokuk and State of Iowa, have invented a certain new, useful, and valuable Improvement in Hame-Tug Couplings, of which the following is a full, clear, and exact description.

My invention has relation to hame-tug couplings; and it consists in the novel construction and arrangement of its parts, as described hereinafter.

The object of the invention is to provide a hame-tug from which the forward end of the trace may be easily and readily disconnected and as easily and readily connected.

The further object of the invention is to provide a hame-tug that will securely hold the parts together when connected and prevent any possibility of their becoming prematurely disconnected.

Figure 1:
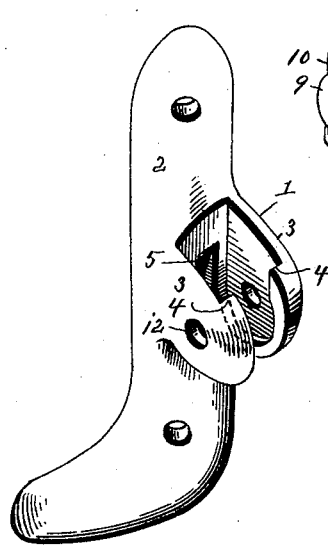
Figure 2:
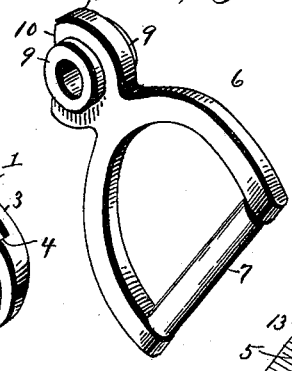
Figure 3:
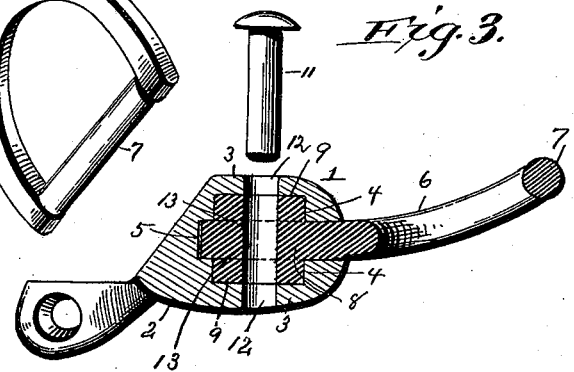
Figure 4:
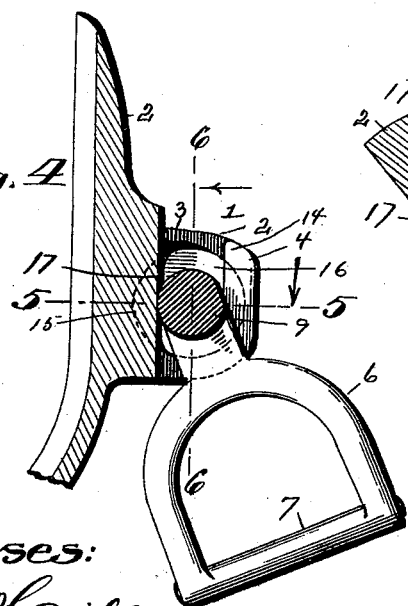
Figure 5:
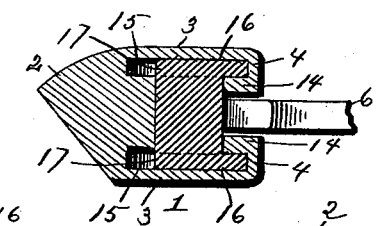
Figure 6:
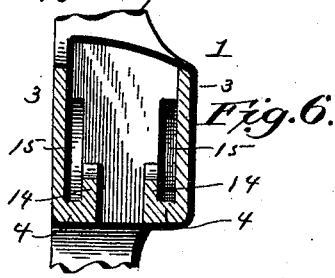

In the accompanying drawings, Figure 1 is a perspective view of the socket which is adapted to be secured to the hame. Fig. 2 is a perspective view of the eye adapted to engage the socket. Fig. 3 is a horizontal sectional view of the socket and eye as shown in Figs. 1 and 2, said socket and eye being engaged. Fig. 4 is a transverse sectional view of a modified form of the socket and eye, said figure showing the method of engaging the eye with the socket. Fig. 5 is a sectional view on the line 5 5 of Fig. 4. Fig. 6 is a sectional view on the line 6 6 of Fig. 4, the eye being removed.

The socket 1 may be located directly on the hame or it may be located on a suitable section 2, as shown in Fig. 1, and said section may be secured to the hame. The socket consists of the perpendicular walls 3 3, said walls being opposite each other and similar in construction. The outer ends of the walls are provided with the inwardly-extending lugs 4 4. These lugs being so located and extending toward each other diminish the space between the walls 3 3 at their outer ends. The lugs also extend along the lower edges of the walls 3 3 and are integral with the walls and the hame or the section 2. The recess 5 is cut in the hame or in the section 2, said recess being located between the walls of the socket 1. The eye 6 is preferably curved, as shown in Fig. 3. The trace is secured or engages the perpendicular bar 7 of the eye. At the opposite end the eye is provided with the integral shank 8. Said shank is provided on its opposite sides with a drum 9. The shank 8 is substantially circular in its shape, having a flattened section 10 to engage the eye 6 with the socket. The lower side of the eye is passed between the walls of the socket 1, and the drums 9 of the shank 8 are slipped down between said walls, the flattened section 10 of the shank 8 passing along the back wall of the socket. When the shank 8 is at the lowest point in the socket, the outer end of the eye 6 is swung up, and this brings the upper curved surface of the shank 8 in the socket 5, as shown in Fig. 3, and thus the eye is securely held in the socket. To disengage the eye, the operation is reversed, and the parts can be easily disconnected.

In Fig. 3 a pin 11 is shown, said pin being adapted to pass through the perforations 12 12 in the side of the socket and the registering perforation 13 through the shank 8. Said pin is used where it is intended to hold the parts permanently together, but when it is desired to have the parts readily disconnected the said pin and perforations are dispensed with.

In the form as shown in Figs. 4, 5, and 6 the lugs 4 are provided with inwardly-extending flanges 14 and the central recess 5 is dispensed with, and in lieu thereof two recesses 15 15, one located at each side of the socket, are provided. The drum 9 is provided at each end with a substantially circular flange 16, each said flange having a flattened section 17, as shown in Figs. 4. The parts as shown in Fig. 4, 5, and 6 are engaged and disengaged in a similar manner as described for the parts shown in Figs. 1, 2, and 3.

Having described my invention, what I claim as new, and desire to secure by Letters Patent, is—

A hame-tug coupling consisting of a socket located on the hame, said socket having perpendicular walls, inwardly-extending lugs located on said walls, a recess located in the back of the socket and between the walls, an eye having a substantially circular shank, said shank having a flattened section on the periphery thereof, a drum extending laterally from each side of the shank, the shank adapted to engage the socket when slipped perpendicularly therein.

In testimony whereof I affix my signature in presence of two witnesses.

CHRISTIAN F. SANDERS.

Witnesses:
   WM. A. BELL,
   G. G. WOODIN.